US005293030A

United States Patent [19]

Dietrich et al.

[11] Patent Number: 5,293,030

[45] Date of Patent: Mar. 8, 1994

[54] METHOD AND DEVICE FOR PROCESSING MAIL

[75] Inventors: Klaus Dietrich; Wolfgang Thiel, both of Berlin, Fed. Rep. of Germany

[73] Assignee: Francotyp-Postalia GmbH, Berlin, Fed. Rep. of Germany

[21] Appl. No.: 848,262

[22] Filed: Mar. 9, 1992

[30] Foreign Application Priority Data

Mar. 9, 1991 [DE] Fed. Rep. of Germany ....... 4108180

[51] Int. Cl.[5] .................... G06F 7/08

[52] U.S. Cl. .................... 235/381; 364/464.02

[58] Field of Search .................... 235/380, 381, 382; 364/464.02, 464.03

[56] References Cited

U.S. PATENT DOCUMENTS

| | | | |
|---|---|---|---|
| 4,901,240 | 2/1990 | Schneck | 235/380 |
| 4,923,022 | 5/1990 | Hsieh | 364/464.03 |
| 4,940,887 | 7/1990 | Sheng-Jung | 364/464.03 |
| 4,978,839 | 12/1990 | Chen et al. | 235/492 |
| 5,025,386 | 6/1991 | Pusic | 364/464.02 |
| 5,065,000 | 11/1991 | Pusic | 364/464.03 |
| 5,121,328 | 6/1992 | Sakai et al. | 364/464.03 |

FOREIGN PATENT DOCUMENTS

| | | | |
|---|---|---|---|
| 2215668 | 9/1989 | United Kingdom | 364/464.02 |

*Primary Examiner*—E. Rollins Cross
*Assistant Examiner*—Erick Solis
*Attorney, Agent, or Firm*—Herbert L. Lerner; Laurence A. Greenberg

[57] ABSTRACT

A device for processing mail and charging required postage includes a standardized mail depositing device having a transport catch. A charging unit is connected to the mail depositing device for charging postage after mail has been inserted in the mail depositing device and for unlocking the transport catch. Secured storage containers receive mail from the mail depositing device. A method for processing mail and charging required postage includes inserting mail into a standardized mail depositing device having a transport catch. Postage is charged after the mail has been inserted in the mail depositing device and then the transport catch is unlocked, with a charging unit connected to the mail depositing device. The mail is fed into secured storage containers from the mail depositing device.

12 Claims, 1 Drawing Sheet

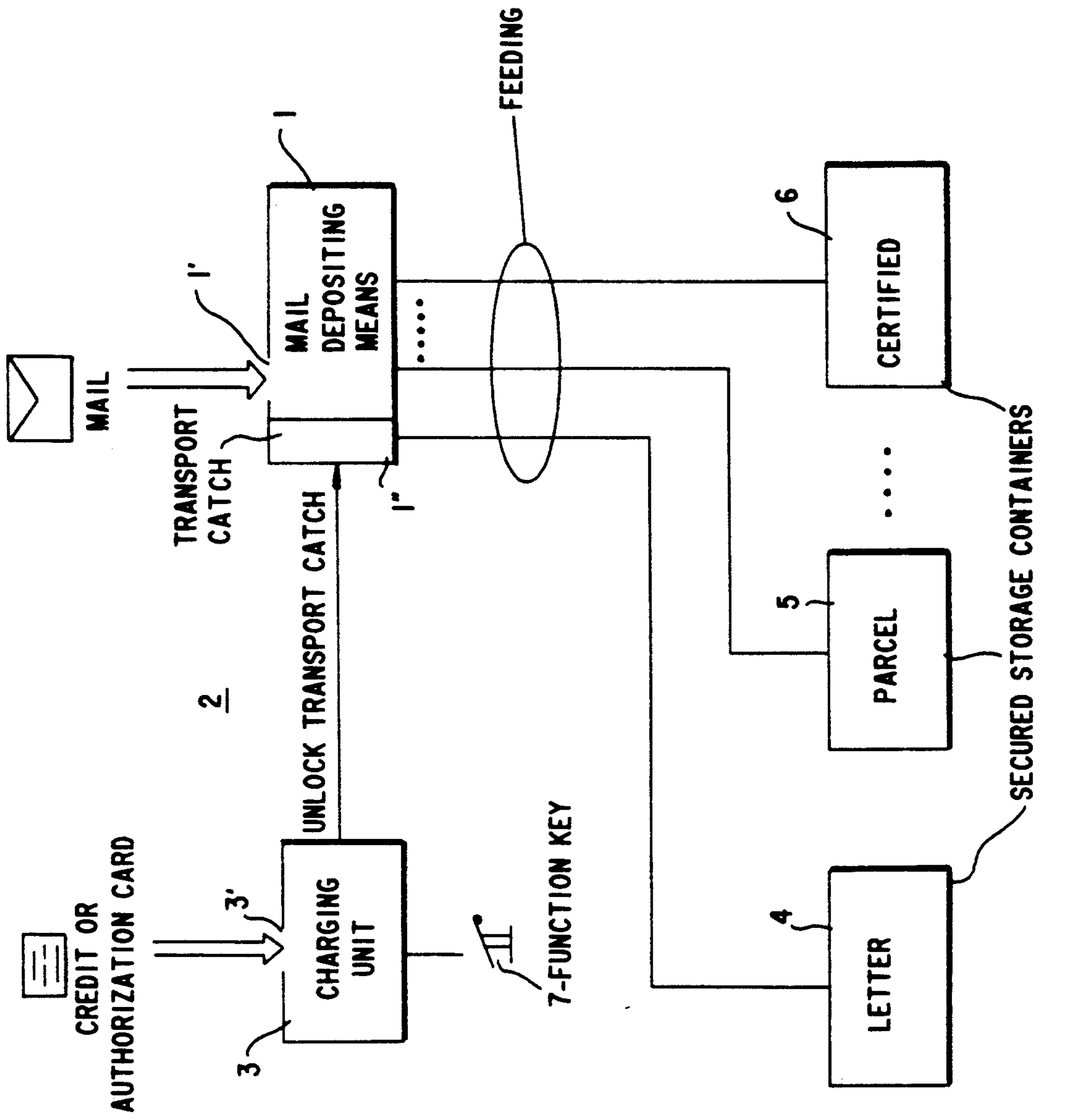
MAIL
MAIL DEPOSITING MEANS
1
1'
1"
TRANSPORT CATCH
FEEDING
UNLOCK TRANSPORT CATCH
2
CREDIT OR AUTHORIZATION CARD
3'
CHARGING UNIT
3
7-FUNCTION KEY
CERTIFIED
6
PARCEL
5
LETTER
4
SECURED STORAGE CONTAINERS

METHOD AND DEVICE FOR PROCESSING MAIL

The invention relates to a method and a device for processing mail along with charging the required postage.

.Customarily, mail, such as letters, postcards, small parcels, etc. is processed by buying and affixing stamps or, if there is a large amount of mail, by using franking devices and then taking it out to be mailed. In the offices of large organizations or companies such work requires a large amount of personnel as well as large expenditures for mail processing means. Franking machines which are used for such purposes, print the postage on the mail by means of a printing device thereof. Such machines must have a high degree of security against manipulation. Subsequent sorting to determine the type of mailing, such as airmail, registered mail, etc. is required.

It is accordingly an object of the invention to provide a method and a device for processing mail, which overcome the hereinafore-mentioned disadvantages of the heretofore-known methods and devices of this general type and which permit the processing of mail in a simple manner without expensive printing of postage and manual sorting, if required.

With the foregoing and other objects in view there is provided, in accordance with the invention, a device for processing mail and charging required postage, comprising standardized mail depositing means having a transport catch, a charging unit connected to the mail depositing means ror charging postage after mail has been inserted in the mail depositing means and for unlocking the transport catch, and secured storage containers for receiving mail from the mail depositing means.

In accordance with another feature of the invention, there are provided means for activating the charging unit with a postage credit card or authorization card.

In accordance with a further feature of the invention, there are provided additional mail depositing means, the mail depositing means being provided for receiving various sizes of mail.

In accordance with an added feature of the invention, the secured storage containers include individual storage containers for different types of mail and different destinations.

In accordance with an additional feature of the invention, there is provided a function key connected to the charging unit for determining a type of mail through the charging unit and the mail depositing means and activating one of the storage containers.

In accordance with yet another feature of the invention, there are provided means for unlocking the storage containers by inserting a special chip card into the charging unit for removing the mail.

In accordance with yet a further feature of the invention, the special chip card has means for storing the amount of postage used for evaluation in a central clearing house.

With the objects of the invention in view, there is also provided a method for processing mail and charging required postage, which comprises inserting mail into standardized mail depositing means having a transport catch; charging postage after the mail has been inserted in the mail depositing means and then unlocking the transport catch, with a charging unit connected to the mail depositing means; and feeding the mail into secured storage containers from the mail depositing means.

In accordance with another mode of the invention, there is provided a mail processing method which comprises activating the charging unit with a postage credit card or authorization card.

In accordance with a further mode of the invention, there is provided a mail processing method which comprises depositing the mail into different mail depositing means for various sizes of mail.

In accordance with an added mode of the invention, there is provided a mail processing method which comprises feeding the mail into individual storage containers of the secured storage containers for different types of mail and different destinations.

In accordance with an additional mode of the invention, there is provided a mail processing method which comprises determining a type of mail through the charging unit and the mail depositing means and activating one of the storage containers with a function key connected to the charging unit.

In accordance with yet another mode of the invention, there is provided a mail processing method which comprises unlocking the storage containers by inserting a special chip card into the charging unit for removing the mail.

In accordance with a concomitant mode of the invention, there is provided a mail processing method which comprises storing the amount of postage used on the special chip card for evaluation in a central clearing house.

An advantage of the invention lies in the simple structure of a mail processing device and in its economical manufacture and maintenance, because there is no printing of postage with this method and therefore no printing device is required.

Other features which are considered as characteristic for the invention are set forth in the appended claims.

Although the invention is illustrated and described herein as embodied in a method and a device for processing mail, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a schematic and block circuit diagram of a device for carrying the method of processing mail according to the invention.

Referring now to the single figure of the drawing in detail, there is seen a mail processing device according to the invention, which for all practical purposes is an intelligent mailbox, including mail depositing means 1, an operating device 2, a charging unit 3 and at least one storage container 4, 5, 6. The method includes two steps, that of charging the postage and of subsequently securely storing the mail, while being separated by the type of mailing if possible, in a container that is only accessible to authorized personnel.

In the simplest case, the mail depositing means are formed of an opening, for example a mail slot 1' for a standard-size letter, and a transport catch 1''. The transport catch 1'' is only unlocked following payment of the postage. After this step, the mail falls into a storage container 4, 5 or 6. Separate mail depositing means are provided for other sizes requiring different postage, but a common storage container is used.

Individual storage containers are available for special types of mail and destinations. Distribution to these containers is possible either through individual mail depositing means or by control through the operating device. The use of different storage containers is necessary because without printed postage it is not possible to differentiate between the types of mailing.

In comparison with the devices of conventional franking apparatus, the operating device has been reduced to a minimum. Only one amount of postage is charged with standard mail. When processing mail with different postage, the selection of the postage is performed by way of selecting the mail depositing means which are identified, for example, by labels with the appropriate postage.

In a variant of the method, a function key 7 can designate a different type of mailing and in this way control not only the postage charge, but also the access to the corresponding storage container 4, 5, 6.

A slit-like opening 3' for a postage credit card or an authorization card is furthermore provided at the front of the mail processing device. The charging unit 3 is activated through the postage credit card. The simultaneous action of the postage credit card and the striking of the mail against the transport catch 1" of the mail depositing means 1, on one hand causes charging of the postage and on the other causes unlocking of the transport catch 1". The mail is considered to have been franked and reaches the associated storage container 4, 5, 6.

Settling of the postage by means of a credit card permits the employment of the mail processing device in public commerce in a post office and/or additionally with conventional mail boxes.

When using the mail processing device in organizations or companies, the use of postage credit cards assists in the charging of the postage to the appropriate users.

A throw-away card or a reusable and rechargeable card can be used as a postage credit card.

In the same way, the known possibilities for pre-payment of fees, such as remote pre-payment or recharging by authorized persons, can be used.

The storage container or containers 4, 5, 6 is or are protected against unauthorized opening by means of safety locks or seals. Access to the storage containers can also be made possible by a special coded card. In this case, the coded card is inserted into the opening 3' for the postage credit card for unlocking of the storage containers 4, 5, 6. Additional security can be provided by encrypting a data exchange between the chip card and the charging unit 3.

A combination of removal of the mail and taking over the accumulated and registered postage is also possible. In this case, the immediate charging to the postage credit card and thus the credit card itself are eliminated. The accumulated postage is cumulatively stored in a conventional postage memory. In order to remove the mail, the person authorized to do so identifies himself or herself by means of a special chip card, as described above. Following identification, the amount present in the postage memory is transferred to the special chip card under a registration number which identifies the mail processing device. The postage due for a plurality of customers can be simultaneously stored on this chip card, so that the authorized person only needs to be equipped with one chip card. In this way it is in a position to record the respective actual postage due, besides the outgoing mail of the customer. Payment of the postage due takes place by reading out the corresponding data from the chip card. A central computer connected with a read-out device identifies the respective registration numbers of the mail processing device with the accounts of the customers maintained in a central clearing house and charges the amounts used to these accounts.

We claim:

1. A device for processing mail and charging required postage, comprising standardized mail depositing means having a transport catch, a charging unit connected to said mail depositing means for charging postage after mail has been inserted in said mail depositing means, secured storage containers for receiving mail from said mail depositing means, and means for receiving a postage credit card or authorization card and for activating said charging unit after the postage credit card or authorization card has been inserted, and for subsequently unlocking said transport catch and depositing the mail without a postage imprint into said secured storage containers.

2. The mail processing device according to claim 1, including additional mail depositing means, said mail depositing means being provided for receiving various sizes of mail.

3. The mail processing device according to claim 1, wherein said secured storage containers include individual storage containers for different types of mail and different destinations.

4. The mail processing device according to claim 3, including a function key connected to said charging unit for determining a type of mail through said charging unit and said mail depositing means and activating one of said storage containers.

5. The mail processing device according to claim 3, including means for unlocking said storage containers by inserting a special chip card into said charging unit for removing the mail.

6. The mail processing device according to claim 1, including means for unlocking said storage containers by inserting a special chip card into said charging unit for removing the mail, said special chip card having means for storing the amount of postage used for evaluation in a central clearing house.

7. A method for processing mail and charging required postage, which comprises inserting mail into standardized mail depositing means having a transport catch; inserting a postage credit card or authorization card into a charging unit connected to the mail depositing means; subsequently charging postage and unlocking the transport catch, with the charging unit; and feeding the mail without a postage imprint into secured storage containers from the mail depositing means.

8. The mail processing method according to claim 7, which comprises depositing the mail into different mail depositing means for various sizes of mail.

9. The mail processing method according to claim 7, which comprises feeding the mail into individual storage containers of the secured storage containers for different types of mail and different destinations.

10. The mail processing method according to claim 9, which comprises determining a type of mail through the charging unit and the mail depositing means and activating one of the storage containers with a function key connected to the charging unit.

11. The mail processing method according to claim 9, which comprises unlocking the storage containers by inserting a special chip card into the charging unit for removing the mail.

12. The mail processing method according to claim 7, which comprises unlocking the storage containers by inserting a special chip card into the charging unit for removing the mail, and storing the amount of postage used on the special chip card for evaluation in a central clearing house.

* * * * *